United States Patent [19]

Gibson

[11] Patent Number: 4,884,926
[45] Date of Patent: Dec. 5, 1989

[54] DOWELLING JIG

[75] Inventor: Jeremy H. Gibson, Eastlake, Ohio

[73] Assignee: Leichtung Inc., Warrensville Heights, Ohio

[21] Appl. No.: 302,183

[22] Filed: Jan. 26, 1989

Related U.S. Application Data

[63] Continuation-in-part of Ser. No. 134,314, Dec. 14, 1987, abandoned.

[51] Int. Cl.$^4$ .............................................. B23B 49/00
[52] U.S. Cl. .................................. 408/115 R; 269/154; 408/72 R; 408/108
[58] Field of Search .................... 33/666, 670, 673; 144/27, 92, 104, 106; 408/72 R, 72 B, 103–109, 151 R, 115 B; 269/87.3, 154

[56] References Cited

U.S. PATENT DOCUMENTS

| | | | |
|---|---|---|---|
| 2,470,038 | 5/1949 | Long | 408/109 |
| 2,783,665 | 3/1957 | Saunders | 408/108 |
| 3,062,076 | 11/1962 | Craig | 408/105 |
| 3,674,376 | 7/1972 | Silken | 408/115 R |
| 3,807,889 | 4/1974 | Kiezel | 408/109 X |
| 4,421,442 | 12/1983 | Lindblad | 408/108 X |
| 4,669,926 | 6/1987 | Wilcox, Jr. | 408/107 X |
| 4,730,959 | 3/1988 | Aerni et al. | 408/72 R X |

FOREIGN PATENT DOCUMENTS 1168349  7/1985  U.S.S.R. ........................ 408/115 B

Primary Examiner—Steven C. Bishop
Attorney, Agent, or Firm—Frank B. Robb

[57] ABSTRACT

A dowelling jig having provision for simultaneously clamping workpieces in which dowels are to be inserted, wherein the jig comprises a pair of movable clamping elements, movable toward and from a stationary element, and arranged for uniform movement in that manner by a screw member which causes the clamping action to be effected simultaneously with each of at least two workpieces, the elements being connected by links which in turn provide for drilling in guides at the ends thereof, the drill guides being movable on axes which are maintained in alignment by the linkage arrangement thereof, the links causing parallel, simultaneous movement of the drill guide means whereby the drilling for dowels is uniformly spaced in each workpiece.

9 Claims, 2 Drawing Sheets

U.S. Patent    Dec. 5, 1989    Sheet 2 of 2    4,884,926
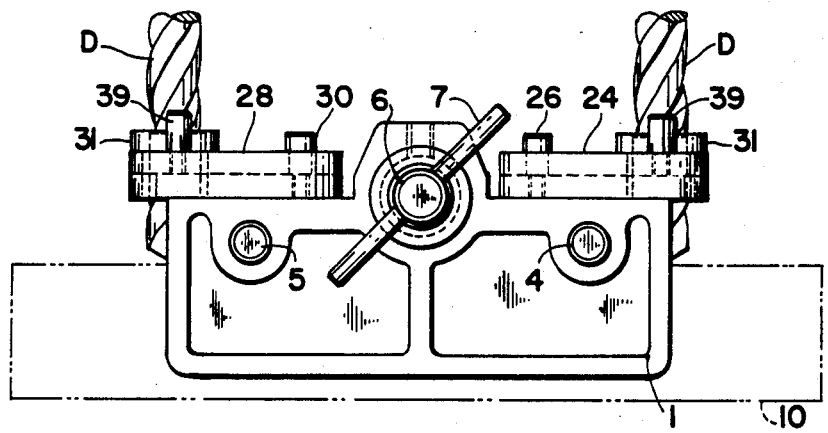
FIG. 3
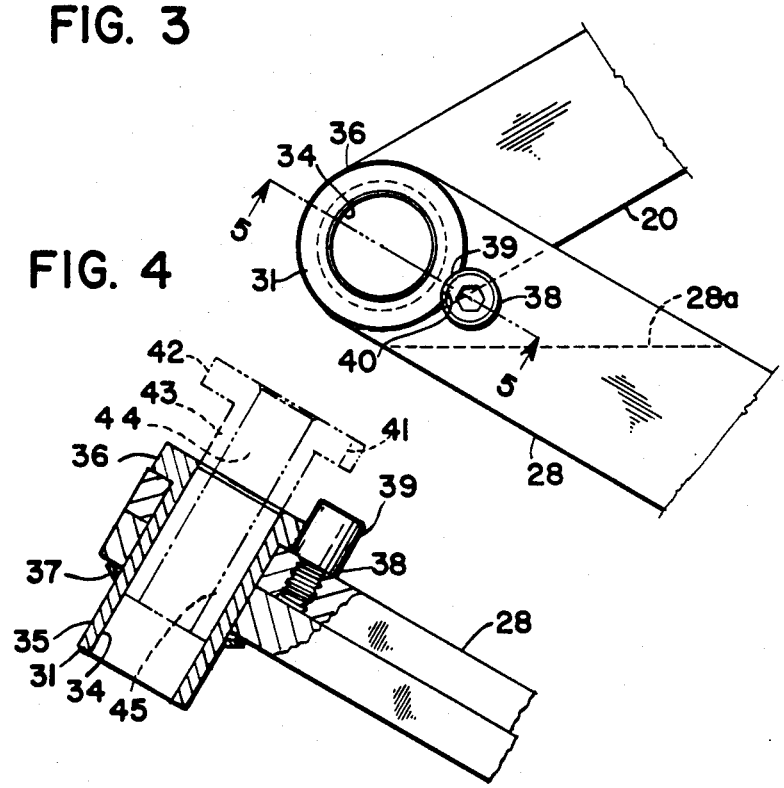
FIG. 4
FIG. 5

DOWELLING JIG

This application is a continuation-in-part of application Ser. No. 07/134,314, filed Dec. 14, 1987, now abandoned.

GENERAL BACKGROUND OF THE DISCLOSURE

The disclosure hereof is of a dowelling jig whereby the assembly of two workpieces which are normally to be arranged in edge to edge relationship and positioned by dowels inserted in such edges, is effected so that absolute alignment of the workpieces when the dowels are inserted is ultimately provided, the fact that both workpieces are arranged for simultaneous clamping into operating position so to speak being substantially different from the common everyday type of dowelling jig wherein each workpiece is gripped separately and the dowel drilling action effected separately so to speak, resulting in many cases in some misalignment or at least not as assured alignment as is contemplated by the concept disclosed herein.

As suggested the dowelling jig hereof is formed so that clamping members or elements can be moved simultaneously by a screw arrangement toward and from one another, all the elements being connected by linkage which in turn provides for mounting of drill bushings and the drilling of the holes to receive the dowels being uniformly arranged.

It is well known that dowellings jigs as such, provide for clamping of one single workpiece at a time which sometimes causes problems and as a result the concept hereof of clamping both workpieces in which the dowels are to be inserted in alignment, is deemed to provide an essential improvement in the dowelling art.

THE PRIOR ART

There are a number of patents relating to drilling of dowel holes, although only remotely related to the disclosure herein.

Most of the prior patents including Patent No. 3,807,889, contemplate drilling dowel holes in a single board at any one time, even if centered in the edge thereof, and this patent could not be used to grip two boards since the mechanism will not embrace a pair of boards even at the same time.

Patent No. 4,669,926 likewise contemplates drilling one board or other object at a time and does not suggest use for dowel hole drilling, even though providing a centering action.

Similarly Patent No. 2,783,665 lacks provision for gripping and drilling more than one object at a time and also cannot automatically space a series of holes in the object.

Patent No. 4,730,959 is simply a jig providing for location of holes and no gripping or clamping action.

Patent No. 3,674,376, while providing for gripping two boards requires pre-setting and drilling one hole and subsequent manipulation of an arm for each drilling operation, and requires measurements each time a different pair of boards is to be operated on.

While Patent No. 4,421,442, shows gripping of a pair of boards or the like, it provides for locating the drill holes in the same place each time, but not necessarily in the center of the edge.

Patent No. 3,062,076, discloses a bushing arrangement but only that and not in a combination where dowelling is contemplated or required.

The Russian Patent No. 1,168,349, discloses a link arrangement which will drill a series of equally spaced holes at predetermined intervals, maintaining such spacing for different distances. However, it does not contemplate use for drilling pairs of holes as in dowelling, and also does not contemplate gripping boards or the like in any relationship. At most it might be availed of for locating holes in one board edges at uniform spacing but not for gripping two boards of any predetermined thickness at any single setting.

Patent No. 2,470,038, discloses gripping and drilling action but not automatically, nor without setting for different thickness boards. It does not contemplate that a pair of boards be simultaneously gripped and that holes are centered automatically, irrespective of the thickness of the boards.

DETAILED DESCRIPTION OF THE INVENTION

Reference is now made to the drawings wherein

FIG. 3 is an end view of the dowelling jig of this concept looking from the right hand end of FIG. 1.

FIG. 4 is a detailed fragmentary view showing the arrangement for mounting a drill bushing in certain of the parts of the jig.

FIG. 5 is a view in elevation of the disclosure of FIG. 4 with a detailed sectional view thereof to show the arrangement of the drill bushing.

Figure 1:
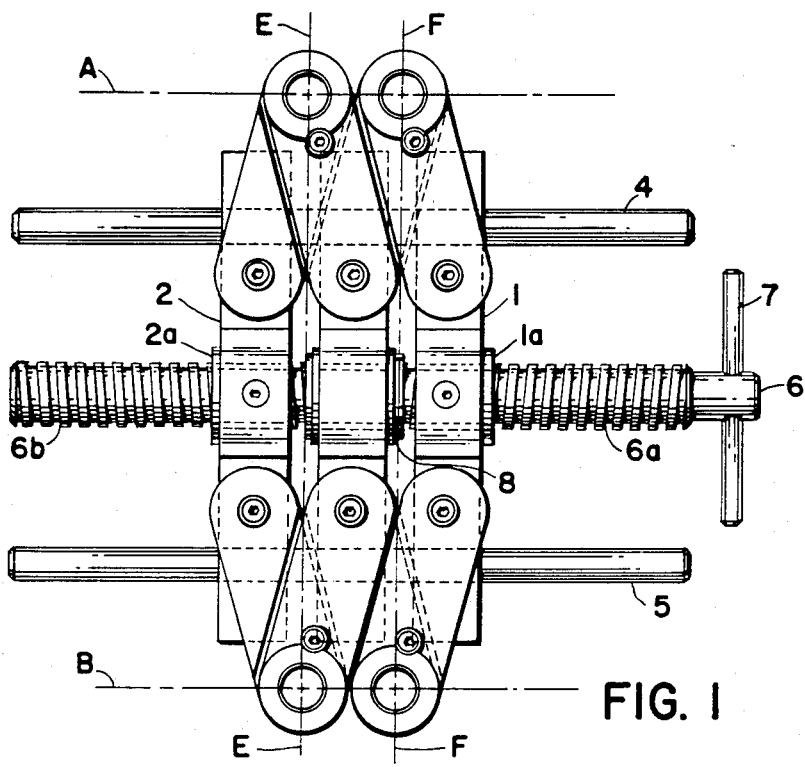
FIG. 1 is a top plan view of the dowelling jig of this concept disclosing the same in closed position.

With the foregoing description of the figures in mind, FIG. 1 is referred to along with FIG. 3 to disclose the jig as a whole comprised of a pair of movable spaced clamping elements generally rectangular in elevation indicated at 1 and 2, with a central stationary clamping element 3 intermediate the elements 1 and 2.

All the elements are positioned on guide rods 4 and 5 so that the movement of the parts 1 and 2 will be maintained in aligned condition.

In order to effect such movement, a screw operating member is provided and designated at 6, with the handle 7 thereof for effecting rotation, the threads 6a of such screw being what are known as Acme or square threads and of one hand, and threads of like kind but of the opposite hand denoted 6b. Since the screw is rotatably mounted at its center portion in a bushing 8, and thus fixed against longitudinal movement in the stationary part or element 3, rotation of handle 7 will cause the elements 1 and 2 to move toward and from one another since the respective threads of the member and correspondingly threaded bushings 1a and 2a provide for such operation.

The foregoing arrangement provides for simultaneous gripping of workpieces such as suggested in FIG. 3 by the part denoted 10 shown in dotted lines, which may extend below the guide rods 4 and 5 as will be understood from that disclosure.

Figure 2:
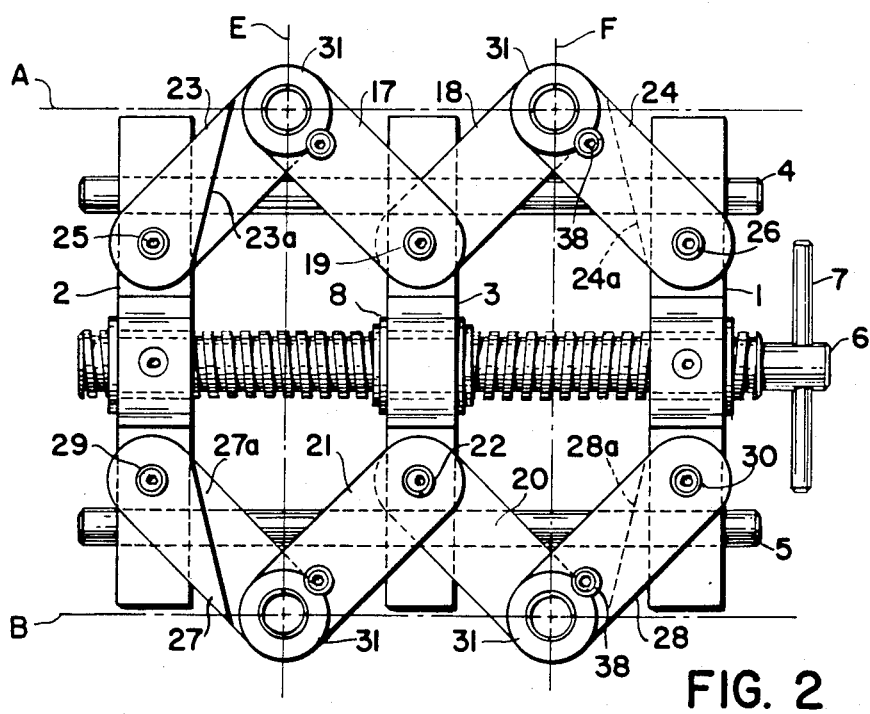
FIG. 2 is a similar view to Figure but with the dowelling jig arranged so that the respective elements thereof are in what may be termed open position.

Referring again to FIG. 1 and also to FIG. 2, it will be noted that a series of links which may be termed positioning means is provided, to effect simultaneous clamping and releasing movement of the elements 1 and 2.

As shown in FIG. 2, the links referred to are provided in pairs and each of elongated substantially identical overall dimensions and shapes. Of these links those identified as 17 and 18 are connected at their inner ends, to a pivot 19 on the member 3, opposite links 20 and 21 being connected to member 3 at pivot 22.

The links 23 and 24 are connected at their inner ends at pivots 25 and 26 to the movable clamping elements 2 and 3 respectively.

At the opposite ends of the clamping elements 1 and 2, links 27 and 28 are pivotally connected at their inner ends at 29 and 30.

It is noted from the foregoing that the linkage arrangement is such that the links form pairs and the outer end connections extend in opposite directions as to such ends.

The links 23,24 and 27,28 are formed with a cut away area in each, 23a, 24a, 27a and 28a, these links thus providing for the parallelogram movement from the position shown in FIG. 2, to that of FIG. 1 and those in between to effect the uniform clamping and releasing action of the elements 1 and 2.

In order to complete the connections of the links at the respective ends of the elements 1 and 2, the links 17 and 18 are provided with the bushing parts 31, and those parts in turn provide pivotal connections of those links with links 23 and 24. The bushings 31 not only provide the desired pivotal connection, but also receive a drill and guide the same in drilling action to form dowel openings in alignment in each of the workpieces clamped by the elements 1 and 2.

At the other ends of the clamping elements 1 and 2 the links 20 and 21 are pivotally connected to the links 28 and 27 respectively by identical bushings 31 for the desired pivotal action.

While these bushings are all arranged to provide the pivotal connection shown and desired, it is also necessary that they be restrained from rotating during the drilling action, and thus a unique combination function is accomplished.

This is shown in detail in FIGS. 4 and 5 particularly where the pivot-drill bushing 31 is disclosed by way of illustration it being understood that the other so designated bushings are similarly formed.

Since dowelling usually involves dowel openings of ¼" in diameter or less, the bushing 31 is formed with a ½" diameter bore 34 and the body 35 of the bushing is further formed with a flange 36 at its upper end. In order to keep the bushing in place, a grip washer or lock ring of conventional form denoted 37 having inwardly extending teeth is positioned on the lower end of the bushing to prevent undesired removal thereof.

Since rotation of the bushing is also to be prevented, a stop part 38 is provided on certain links, in this case by an Allen screw whose head 39 is received in a mating recess 40 in the periphery of the flange 36 for example.

It is noted that the head 39 is of sufficient height as seen in FIG. 5, to engage in a recess 41 of the flange 42 of a bushing 43, which may for example have a ⅜ inch bore 44, the body 45 of bushing 43 being of ½" exterior diameter to be received in the bore 34 of the pivot-drill bushing 31.

Thus the bushing 43 will also be rotatively restrained when a drill is entered therein.

The other pivot-drill bushings 31 will also be rotatively restrained and adapted to receive drills and also bushings such as 43 or in fact smaller similarly formed bushings depending upon the required dowel openings desired.

In any event, any bushing inserted in bushing 31 will be prevented form rotating during rotation of a drill operating therein, if similarly formed.

It should be understood that the head 39 of part 38 shown as an Allen screw, may instead be molded as part of a link, which is of molded plastic, in which case the head 39 would simply be an upstanding cylindrical integral part of a link such as 17, 24, 21 or 28.

In fact other shapes of such a part 39 may be used as long as the flange 36 of the bushing such as 31 is provided with a similar recess, equivalent to the recess 40 previously mentioned.

This will necessarily require that flanges of drill bushings such as 43 will be provided with a recess, mating with that part 39 for example.

Turning again to a consideration of FIGS. 1 and 2, it will be noted that these disclose the respective clamping parts 1 and 2 in extreme positions to receive the edges of boards or other workpieces therebetween, the workpieces being various materials as wood or the like of varying thicknesses and obviously requiring that varying sizes of drills be used where required. Thus the drill bushings previously discussed will be suitably arranged and of suitable size to receive the appropriate drills therein.

As will be seen from FIG. 3, when a workpiece such as 10 is in place, the drills which are indicated at D may be entered into the drill bushings and effect the drilling operation in the edge of the workpiece 10 shown and obviously a like workpiece positioned between the other parts, so that the sequential drilling of holes may be effected, and the holes will be accurately aligned.

Since the axes of the bushing 31 as shown in FIGS. 1 and 2 are compelled by the construction described, to move along the lines A and B, the axes also move along the lines E and F which are at right angles to A and B and because of the mechanical elements disclosed.

Thus the holes will be accurately positioned when the drilling is effected in the edge of each workpiece. When dowels are inserted in openings formed by the drill D, the desired positioning of the workpieces will be effected in all cases.

The same relative position of the holes in each workpiece will be provided by the construction hereinbefore set forth in detail.

It is emphasized that the gripping action of the elements, and the shapes and connections of the various parts, are such as to automatically provide for drilling the holes for dowels in the workpieces, in the center of each and no adjustment of each part is required for different thicknesses of boards.

I claim:

1. A dowelling jig comprising a primary clamping element and secondary clamping elements arranged for guided movement with respect to the primary element and each other, means to guide said elements, at least two sets of links arranged in pairs pivotally connected at their inner ends to the clamping elements and with the axes of the connections in alignment, and at their outer ends pivotally connected whereby the axes of such outer end connections will move along a line parallel with the axes of the inner ends, and the pairs of the other set being connected in the same manner at the inner and outer ends, and extending in an outward opposite direction to the first described links, the outer ends of each set of links being formed to receive drill guide means, whereby drills operated in the guide means will form aligned holes in workpieces clamped by the clamping elements.

2. A dowelling jig as claimed in claim 1, wherein the primary clamping element is positioned intermediate the secondary elements, the links position the elements to grip workpieces therebetween, and the pivotal connections of the outer ends of the links enable drilling at least one hole in each workpiece aligned with a hole in another workpiece whilst each is in gripped position.

3. A dowelling jig as claimed in claim 2, wherein the pivotal connections of the outer ends of the links are provided with removable bushings including a flange with a rotating restraining part on one link engaging said flange, to prevent rotation during drilling, and means to move the secondary clamping elements.

4. A dowelling jig as claimed in claim 3, wherein bushings at the ends of one set of links are maintained in alignment when the elements are moved by the moving means and the moving means effect simultaneous movement of the secondary elements.

5. A dowelling jig as claimed in claim 1, wherein the secondary clamping elements are movable on guide parts, and the means to move each of said elements are formed to move said elements an equal amount toward and from one another.

6. A dowelling jig as claimed in claim 5, wherein the means to move the elements comprise a screw member with opposite pitch threads engaging the corresponding elements to effect simultaneous movement of said elements.

7. A dowelling jig as claimed in claim 4, wherein the identical size and connection of the links act to cause the clamping elements to move uniformly and simultaneously.

8. A dowelling jig comprising elements to clamp at least two workpieces in spaced relationship, means to move said elements simultaneously whilst retaining said relationship, and means operable by the elements to locate dowel holes in the same central corresponding positions in each of the workpieces, irrespective of the thickness of said workpieces.

9. A dowelling jig as claimed in claim 8, wherein corresponding edges of the workpieces are presented in the said relationship, the means to move the elements include a screw member connecting them together, and the operable means consist of offstanding sets of links connected to each element, each set of links comprising at least one pair, the inner ends of which are connected to the clamping elements and to each other at their outer ends, which outer ends provide the hole locating means at the connection of said outer ends.

* * * * *